W. W. GREEN.
Belt Fastening.

No. 230,936.                     Patented Aug. 10, 1880.

Witnesses:
Nat. E. Oliphant
Geo. B. Porter

Inventor:
William W. Green,
per Chas. H. Fowler,
Attorney.

UNITED STATES PATENT OFFICE.

WILLIAM W. GREEN, OF CHICAGO, ILLINOIS, ASSIGNOR OF ONE-HALF OF HIS RIGHT TO GEORGE P. ROSS, OF SAME PLACE.

BELT-FASTENING.

SPECIFICATION forming part of Letters Patent No. 230,936, dated August 10, 1880.

Application filed January 19, 1880.

*To all whom it may concern:*

Be it known that I, WILLIAM W. GREEN, a citizen of the United States, residing at Chicago, in the county of Cook and State of Illinois, have invented certain new and useful Improvements in Belt-Fastenings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
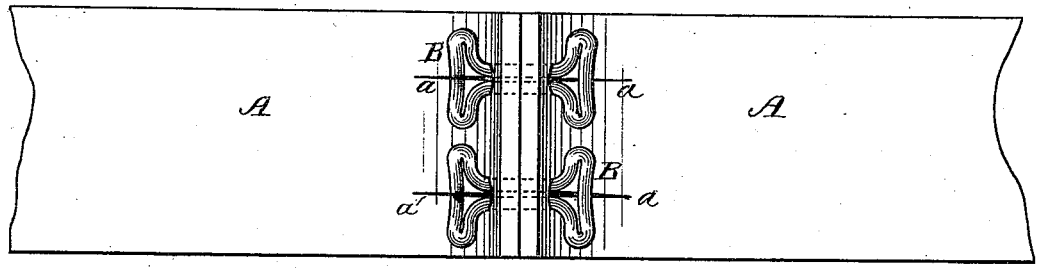
Figure 2:
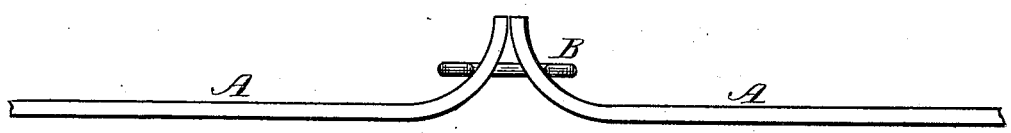
Figure 3:
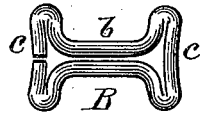

Figure 1 of the drawings is a top-plan view of the ends of a belt secured together with my improved fastening. Fig. 2 is a side or edge view of the same, and Fig. 3 is a detail view of the fastener.

The present invention has relation to that class of belt-fasteners, composed of a double-headed stud, which are inserted through slits in the ends of the belt and turned so as to lie flat on the surface of the belting upon the outside thereof, thus preventing the belt from being drawn apart at the junction. These double-headed studs were formed by punching or stamping them from a flat sheet of metal with a suitable die or other instrument. The studs thus made were found inadequate for the purpose, as they did not possess a sufficient amount of strength for very heavy belting unless they were stamped from an extra-thick plate or sheet of metal. A further objection to the sheet-metal studs is not only the great liability of their bending and breaking, but the danger of their sharp edges or corners cutting into the belt.

It is the purpose of the invention to remove these objections, as far as possible, by constructing the fastener or stud of a single piece of wire bent to form a shank and a head upon each end thereof, thereby producing a fastener of great strength, and one that has no sharp corners or edges to cut through the belt, as will be hereinafter described.

In the accompanying drawings, A A represent the contiguous ends of two sections of belting, the ends being secured together by studs B, which pass through slits $a$ in the belt in the usual manner.

The studs B are composed of or made from a round metal wire by first bending it to form one of the heads $c$, after which the two ends of the wire are bent down and out at right angles to the head and parallel with each other to form the shank $b$, and the ends again bent out at right angles to the shank and around until they meet, which forms the opposite head of the stud. The wire, if desired, may be tinned or galvanized, and the meeting ends of the wire may be soldered together.

The stud B, being composed of wire and bent in the form as above described, gives the fastener a uniform strength, and from the manner in which it is constructed it cannot bend or pull out of the openings in the belt; also, the round surface of the wire prevents the possibility of its cutting into the belt.

Having now fully described my invention, what I claim as new, and desire to secure by Letters Patent, is—

The stud B, composed of wire and bent to form shank $a$ and heads $c$, substantially as and for the purpose set forth.

In testimony whereof I affix my signature in presence of two witnesses.

WILLIAM W. GREEN.

Witnesses:
LEONARD SUNDSTADT,
CHARLES F. MOELLE.